(No Model.)

J. C. STEVENS.
APPARATUS FOR BRAZING METALS.

No. 260,133. Patented June 27, 1882.

Witnesses.
L. F. Connor.
John F. C. Prentkert.

Inventor:
John C. Stevens
by Crosby & Gregory
Attys.

UNITED STATES PATENT OFFICE.

JOHN C. STEVENS, OF NATICK, MASSACHUSETTS.

APPARATUS FOR BRAZING METALS.

SPECIFICATION forming part of Letters Patent No. 260,133, dated June 27, 1882.

Application filed May 12, 1881. (No model.)

*To all whom it may concern:*

Be it known that I, JOHN C. STEVENS, of Natick, county of Middlesex, State of Massachusetts, have invented an Improvement in Apparatus for Brazing Metals, of which the following description, in connection with the accompanying drawings, is a specification.

My invention relates to an apparatus for brazing metals, and is shown embodied in a brazing-clamp for brazing saw-blades and similar articles.

The band or belt saws now commonly in use are frequently broken, and can be conveniently mended by uniting the severed edges by brazing. In the usual method the portions of the saw are held in a suitable clamp, with their edges to be united properly matched together and provided with the flux and spelter or soldering material, after which pinchers or tongs heated sufficiently to melt the said soldering material are closed thereon, embracing the ends of the saw that are to be united. This method requires a forge or other similar fire, so that the saw, when broken, either has to be taken to a blacksmith's shop to be mended or a fire has to made for the express purpose, as there will not commonly be an occasion for such fire where the saw is in use, and in either case a considerable delay is occasioned, and, moreover, it is not certain that the soldering will be properly done, as it is impossible to see the parts operated upon when inclosed by the heated tongs. These objections are removed by my invention, which is shown embodied in an apparatus adapted to employ a blow-pipe flame, such as readily produced from an ordinary lamp or gas-burner, the invention consisting in the combination, with the clamp to hold the portions to be united properly matched together, of a suitable receptacle to retain fragments of charcoal below and around the spot where the solder is to be melted, and a support for the meeting ends of the portions of the blade to be brazed, the flame being applied upon the side opposite to this support and co-operating with the charcoal to heat the metal on all sides.

Figure 1:
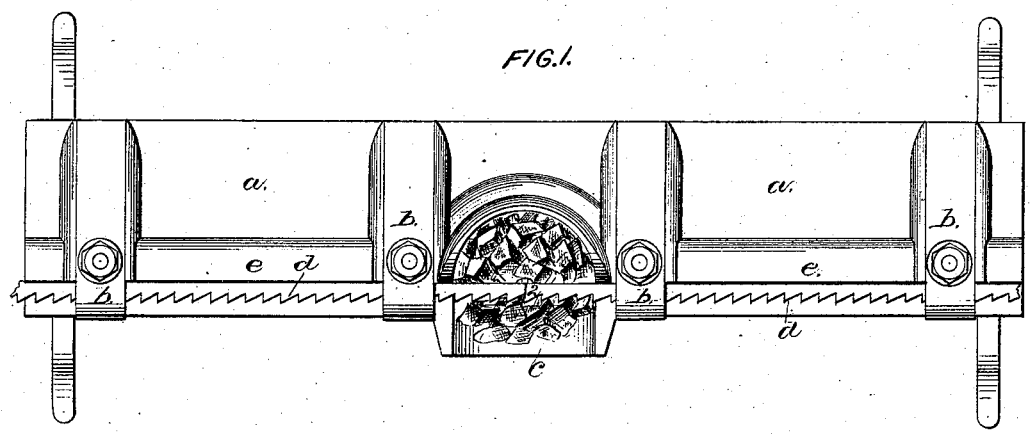
Figure 2:
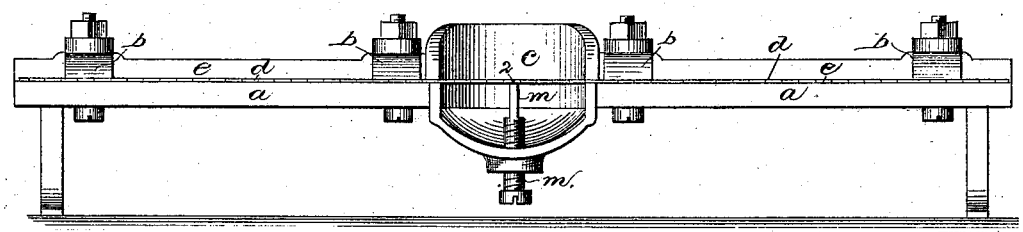

Figure 1 is a top view of my improved brazing apparatus; and Fig. 2, a front elevation thereof, the charcoal being removed from the receptacle.

The frame-work or bed-plate $a$, of any suitable form to receive the articles or pieces to be brazed, held in proper position thereon by clamps $b$, of any suitable or usual construction, is provided with a charcoal-receptacle, $c$, located beneath the point at which the brazing is to be done. The clamps $b$ are shown as movable fingers placed in suitable sockets or grooves and pressed down toward the bed-plate $a$, to hold the article to be brazed tightly thereon, by nuts co-operating with bolts or screws passing through the said bed-plate, with their heads engaging its under side.

When the article to be brazed is a saw, $d$, the bed-plate $a$ is provided with a guiding-ledge, $e$, and a support, $m$, for the ends of the saw to be joined, as at 2, is placed in the receptacle $c$, it operating to hold the two portions of the saw-blade exactly in line with one another, as shown in Fig. 2. This support is made adjustable up and down, it being screw-threaded, as shown, and it may be set a trifle above the plane of the top of the bed-plate $a$, so that the ends of the saw-blade may bear down thereon by their elasticity.

In operation the portions of the saw $d$ or other articles to be joined are clamped upon the bed-plate $a$, with their portions to be joined properly cleaned and fitted and matched together in the receptacle $c$, which is then filled up with fragments of charcoal, as shown in Fig. 1, they being beneath and around the point 2 to be brazed, but not covering the articles at that point, which is then provided with the usual flux or borax and the spelter or soldering material. A flame is then directed thereon by a blow-pipe, and in consequence of the bed of charcoal its heat will not be dispersed in the space that would otherwise be left around the point 2; but the heat which affects the charcoal will cause combustion thereof, and thus increase the effect upon the metal or solder, which will in a very short time melt and unite the articles, as desired.

The support $m$, which could not be used if hot pinchers were employed to melt the solder, saves a large amount of time and trouble in getting the ends of the saw $d$ properly in line, this being, without the said support, attended with considerable difficulty, especially when the ends of the blade have been somewhat sprung and set out of shape in breaking, as frequently happens.

I am aware that a blow-pipe flame has been previously employed for brazing and soldering.

I claim—

1. In an apparatus for brazing saw-blades and similar articles, the combination, with the bed-plate and clamps thereon, of a receptacle and support therein for the meeting ends of the blade, whereby the said ends are maintained in line with one another while acted upon by a flame to melt the soldering material, substantially as described.

2. The combination of the bed-plate and its guiding-ridge and the clamps thereon, with a charcoal-receptacle and adjustable blade-support therein, substantially as and for the purpose set forth.

In testimony whereof I have signed my name to this specification in the presence of two subscribing witnesses.

JOHN C. STEVENS.

Witnesses:
ERASTUS T. BEARSE,
FRANK N. STEVENS.